United States Patent [19]
Balon

[11] 3,942,825
[45] Mar. 9, 1976

[54] PILOT LIGHT HARNESS FOR GAS STOVE

[76] Inventor: Albert J. Balon, 9717 Greenhaven Parkway, Brecksville, Ohio 44131

[22] Filed: July 11, 1973

[21] Appl. No.: 378,318

[52] U.S. Cl. .............................................. 285/132
[51] Int. Cl.² ......................................... F16L 39/00
[58] Field of Search........ 285/132, 137 R, 328, 233, 285/382.4, 382.5; 29/512, 523

[56] References Cited
UNITED STATES PATENTS

| | | | |
|---|---|---|---|
| 1,782,380 | 11/1930 | Daley | 285/132 X |
| 1,817,854 | 8/1931 | Sorensen | 285/382.5 X |
| 2,089,790 | 8/1937 | Halpern | 29/523 X |
| 2,463,883 | 3/1949 | Kinsey | 285/382.5 X |
| 2,877,028 | 3/1959 | Knight | 285/137 R |
| 3,183,394 | 5/1965 | Hipszer et al. | 29/512 X |
| 3,766,631 | 10/1973 | Scheitlin | 29/512 X |
| 3,787,945 | 1/1974 | Pasek | 285/382.5 X |

Primary Examiner—Werner H. Schroeder
Assistant Examiner—Peter Nerbun
Attorney, Agent, or Firm—Arthur L. Cain

[57] ABSTRACT

A pilot light harness for a gas stove including at least one pilot light gas supply tube one end of which is sealingly disposed in a pilot light supply tube manifold or fitting. A method is disclosed for slidingly inserting a pilot light gas supply tube into a recess in a manifold or fitting to a predetermined depth, and thereafter effecting relative movement, axially, between the tube and the manifold to work the metal in and around said recess so as to effect a gastight sealing bead between the supply tube and the manifold.

13 Claims, 6 Drawing Figures

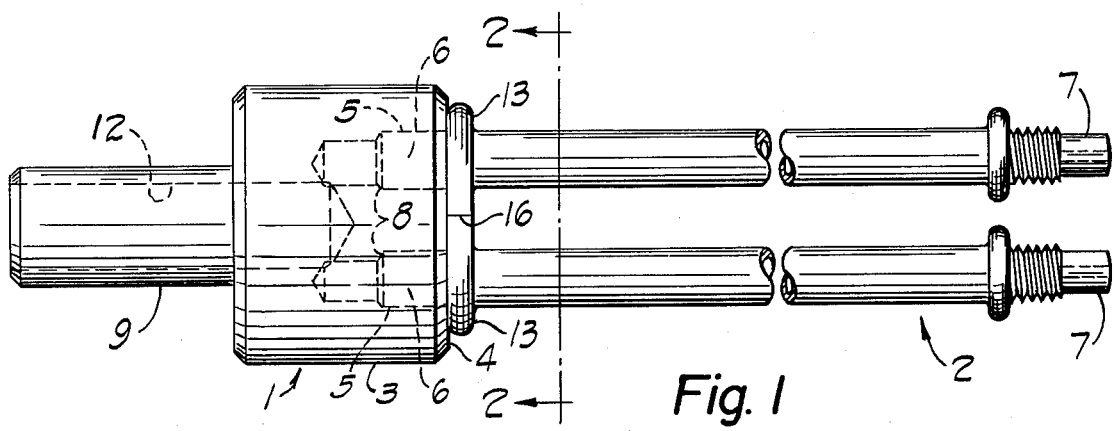
Fig. 1
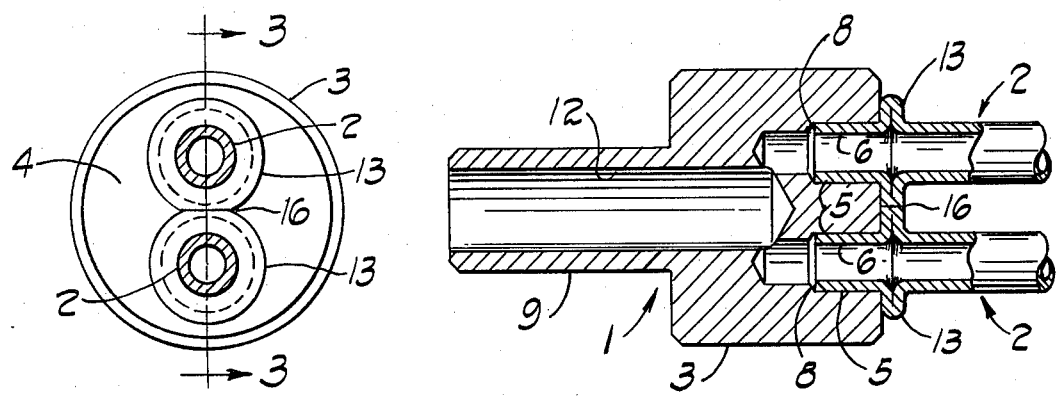
Fig. 2  Fig. 3
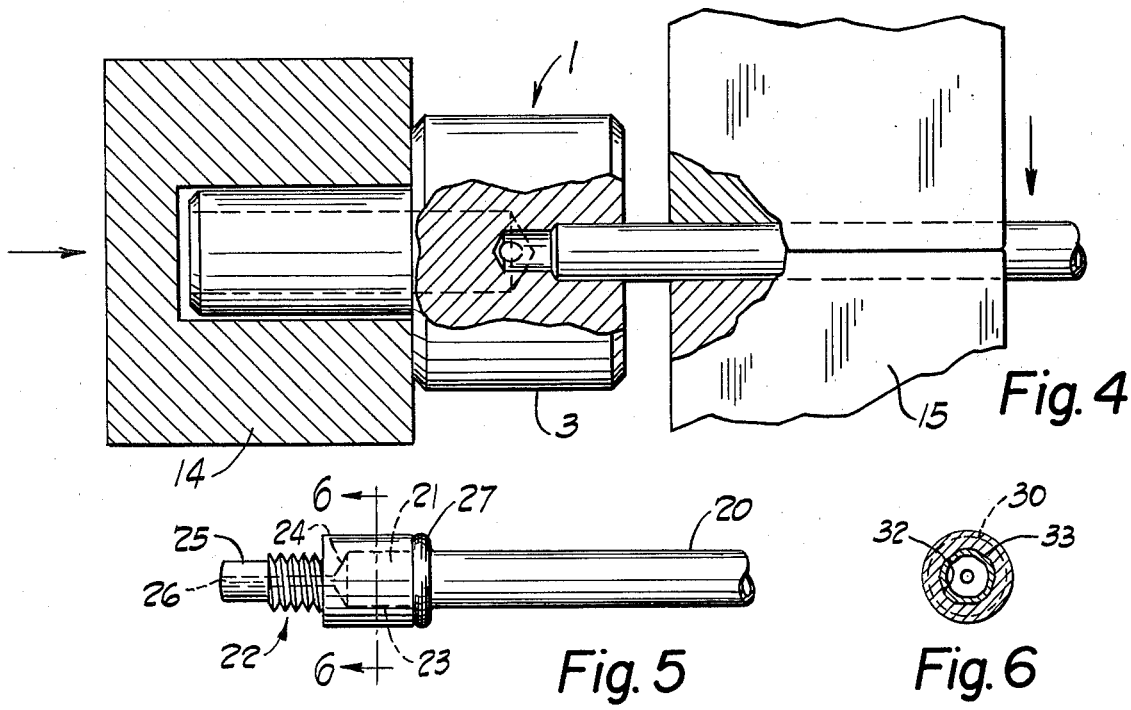
Fig. 4
Fig. 5  Fig. 6

PILOT LIGHT HARNESS FOR GAS STOVE

BACKGROUND OF THE INVENTION

This invention relates to gas stoves and more particularly, to a new and improved pilot light harness comprising an assembly of a pilot light gas supply tube (hereinafter referred to as a pilot tube), one end of which is sealingly inserted in a pilot tube manifold, and which has disposed on the other end a fitting to ensure a steady pilot flame. Conventionally a single manifold supplies two pilot tubes, though a single pilot tube or several pilot tubes may be supplied from a pilot tube manifold.

Gas stoves of the type that are commonly used in kitchens for cooking purposes, are provided with burners which are conveniently lighted by flashing or projecting a normally restricted pilot flame, through a flash tube. One end of the flash tube is disposed next to the pilot flame, and the other end is disposed near the burner so as to place the burner in flame communication with the pilot flame, enabling gas issuing from the burner to be ignited. Typically, the pilot flame burns continuously, and will ignite any flammable gas reaching it. Thus, it is of utmost importance that there be no gas leaks from any portion of the gas supply system to the stove. In particular, because normally there is a continuous flow of gas through a pilot tube manifold and the one or more pilot tubes emanating from the manifold, it is necessary to effect a reliable and rugged gastight seal between each pilot tube and the manifold. Ruggedness of the seal is desirable for two reasons: the pilot harness may be handled roughly when it is fitted into a stove, or at some point during the manufacture of the stove, and the pilot harness is likely to be roughly contacted on occasions when the stove is thoroughly cleaned.

Prior art devices to seal the pilot tube in flow communication with a source of gas include a valve and coupling such as disclosed in U.S. Pat. No. 3,527,410. Such a valve may include a single fitting extending axially from the end of a pilot tube and obviating the need for a separate coupling and valve mechanism, without leakage or similar danger. However, where economics preclude the use of a valve such as is disclosed in the aforementioned patent, it is desirable to sealingly insert a pilot tube into a manifold directly, without benefit of a valve. Such a seal has been effected by slidingly inserting a pilot tube into a recess in a pilot tube manifold and exerting sufficient pressure on the manifold immediately surrounding the pilot tube so as to work the metal in the manifold against the cylindrical surface of the pilot tube, compressing the tube inwardly thus effecting a seal. A seal has also been effected by press-fitting a pilot tube into a recess having a diameter no larger than the tube, and usually, sufficiently smaller than the tube to work, or pare, or shave back enough metal around the tube to effect a seal.

Seals effected as described immediately hereinabove have resulted in a frangible seal, that is, a seal which will not withstand rough handling even if it is not easily disrupted. The risks of utilizing seals such as these have been deemed undue by certain governmental agencies. There is, therefore, a need for supplying an inexpensive pilot light harness in which the tubes are sealingly inserted in a pilot light manifold to form a rugged seal.

SUMMARY OF THE INVENTION

It is, therefore a general object of this invention to provide a new and improved pilot light harness for gas stoves, and the like, including a novel and unique seal for a pilot tube in a pilot tube manifold or fitting.

It is another general object of this invention to provide a direct seal with metal-to-metal contact of a pilot tube within and around a recess in a pilot tube manifold so as to effect a gastight seal between the pilot tube and the manifold.

It is a particular object of this invention to provide a gastight seal around a pilot tube which is inserted in a pilot tube manifold, and which is thereafter axially forced against the manifold with sufficient force to form a sealing bead around the pilot tube.

It is another particular object of this invention to provide a metal-to-metal gastight seal around a pilot tube one end of which is slidably inserted in a recess of a pilot tube manifold and subjected to an axial force sufficient to effect relative movement between the pilot tube and the pilot tube manifold in such a manner as to circumferentially enlarge the portion of the tube within the recess against the wall of the recess, and to form a gastight, circumferential sealing bead around the pilot tube, to seal the periphery of the recess in the pilot tube manifold.

It is a still more specific object of this invention to provide tangentially contiguous gastight sealing beads on at least two pilot tubes proximately disposed in a pilot tube manifold or fitting, to prevent relative rotation of one pilot light tube with respect to the other at the surface of the manifold.

It is yet another specific object of this invention to provide a gastight sealing bead on a pilot tube slidingly inserted in a fitting.

It is a further specific object of this invention to provide a process for sealing an end of a pilot tube by forming a circumferential sealing bead near the end, around a recess in a manifold or fitting in which the pilot tube is inserted with a close sliding fit.

Other objects of this invention include the provision of a pilot light harness which provides a new and improved rugged, metal-to metal, gastight seal between a pilot tube and a pilot tube manifold which provides a new and improved process for directly sealing a pilot tube manifold without press fitting; which provides a new and nonobvious article of manufacture and a method of producing the article with efficacious simplicity and at reduced cost.

These and other objects and advantages of the invention will appear from the following description of preferred forms thereof, reference being had to the accompanying drawings.

BRIEF DESCRIPTION OF THE DRAWINGS

FIG. 1 is a plan view of a pilot light harness showing two pilot tubes sealed near their ends in a pilot tube manifold, with portions of the pilot tubes broken away.

FIG. 2 is a side elevation view of the pilot light harness including a vertical section along the line 2—2 in FIG. 1.

FIG. 3 is a partial vertical section of the pilot harness along the line 3—3 in FIG. 2.

FIG. 4 is a front elevation view, partly in section, along line 4—4 in FIG. 3, of a pilot harness showing the front pilot tube of FIG. 3 in a clamping die.

FIG. 5 is an elevation of a pilot tube, sealed near one end in a fitting.

FIG. 6 is a side elevation section view along the line 6—6 in FIG. 5, showing other preferred embodiments of the invention.

For clarity of presentation, flashing from the clamping die juncture is omitted from the drawings.

DESCRIPTION OF THE PREFERRED EMBODIMENTS

This invention is useful in gas cooking stoves, and the like, and comprises a new and improved pilot light harness for one or more gas pilot lights, and the like, including a new and improved direct metal-to-metal gastight sealing bead which is resistant to seal rupture due to normally expected bending and torquing of the pilot tubes.

A pilot light harness embodying a preferred form of this invention is adapted for use on a conventional gas stove having a gas supply line terminating in a conventional main manifold from which a plurality of branched, feed or supply lines lead to burners which are situated in openings in the stove top. Gas flows through a supply line to a burner when a valve is opened and the gas is lighted by the flow of a pilot light. The pilot light is supplied with gas through a pilot tube which is normally maintained in open gas communication with a pilot tube manifold or distributor, usually in combination with a filter. The entire pilot light apparatus including the pilot tube manifold, the pilot light tubes and the housing for the pilot light flame is conventionally known as the harness.

All of the above is old and, per se, forms no part of the present invention.

Referring now to FIG. 1 which illustrates one particular embodiment of this invention, there is indicated a pilot tube manifold, designated generally at 1, and elongated pilot tubes indicated generally at 2, which are assembled as will be described hereinafter. The manifold includes a body 3 having an upper surface 4 and is provided with recesses 5 which extend into the body from the upper surface, and are generally perpendicular thereto. One end 6 of each pilot tube is inserted into each recess 5. The other end 7 of each pilot tube 2 is adapted to secure a pilot light fitting as will be described hereinafter.

Since a pilot tube 2 is generally cylindrical, each recess is a corresponding cylindrical passage having a diameter slightly larger than the diameter of the end 6 of the pilot tube to permit the end 6 to be slidably inserted in the recess 5. The diameter of the recess is necessarily greater than the outside diameter of the pilot tube to permit easy insertion of the end 6 with a sliding fit. The pilot tube 2 is preferably any suitable workable metal tube of relatively small diameter, such as ⅛-inch aluminum tubing having a wall thickness of about 0.035-inch, and the diameter of a recess is slightly greater, typically about 0.135-inch. Each recess 5 is provided with a stop means, such as a radially inwardly extending internal shoulder 8, at a predetermined depth from the surface 4, against which stop means the end 6 of an inserted pilot tube is abutted. The depth of the stop means is not critical and is typically about the same dimension as the nominal diameter of the pilot tube.

The body 3 of the manifold is provided with a stem portion or conduit 9, oppositely disposed from the upper surface 4. The stem portion 9 has an axial bore 12 which extends into the body 3 of the manifold and intersects the recesses 5 which are thus placed in open flow communication with the axial bore 12 through which gas is supplied to the pilot tubes. Since flow of gas through each pilot tube is mainly determined by the cross-sectional area of the intersection of each recess 5 with the axial bore 12, the area of the intersections are preferably maintained as nearly equal as possible.

In this preferred embodiment of the invention the recesses 5 are proximately disposed in parallel spaced apart relationship with each other. Thus, the longitudinal axes of the end portions of the pilot tubes 2, inserted in the recess, are maintained in parallel spaced apart relationship as shown in FIG. 2. After the ends of the pilot tubes 2 are inserted in the recesses 5, a sealing bead 13 is formed circumferentially on each pilot tube, the sealing bead 13 being in direct metal-to-metal contact with the upper surfaces 4. The sealing bead is a circumferentially enlarged portion of the outer surface of the tube and overlies the periphery of the recess 5 at the upper surface 4 in gastight sealing relationship therewith as shown in FIG. 3. The sealing bead 13 has an unbroken outer surface with no jagged ends, or a break, such as is characteristic of a sealing bead formed by an interference fit between the outer surface of a pilot tube and the wall of a recess.

Referring now to FIG. 4, the sealing bead 13 is formed by supporting the body 3 of the manifold in a suitable support block or die 14. Pilot tubes 2 protrude from recesses 5 in which ends 6 of the pilot tubes are slidingly disposed, resting against the internal shoulders 8. The pilot tubes 2 are clampingly supported, intermediate their ends, and near the surface 4, in a clamping die means 15 adapted to circumferentially, removably secure both pilot tubes simultaneously.

The clamping die is of conventional design and typically includes a split die with grooves having a diameter corresponding to the outside diameter of the pilot tubes. The precise distance from the surface at which the pilot tubes are clamped depends on several factors including the diameter of the tubes, the characteristics of the metal from which the tubes are fabricated, the dimensions of the sealing bead desired, and the like. For example utilizing ⅛-inch aluminum tubes with 0.035-inch wall, the edge of the clamping die nearest the upper surface 4 is preferably about ⅛-inch from the upper surface.

The support block 14 for the body 3, and the clamping die 15 for the pilot tubes, are adapted for relative movement with respect to each other, along the longitudinal axis, for a predetermined distance so chosen as to form a sealing bead of desired size. In operation, the pilot tubes are placed in the lower portion of the open die and the body 3 inserted in the support block 14. The upper portion of the clamping die is then actuated to securely clamp both tubes circumferentially. Movement of support block 14 toward the clamping die 15 is then effected causing axial compression of the pilot tubes between the internal shoulders 8 and the clamping die 15, and forcing the ends 6 of the pilot tubes against the internal shoulders 8; and continued movement of the support block 14 forcibly causes the end portions of the walls of the pilot tubes within the recesses 5, to be distended against the walls of the recesses in gastight relationship therewith. Further continued movement of the support block 14 forces flow of each pilot tube wall around the periphery of each recess 5, and in direct metal-to-metal contact with the upper surface 4 immediately around each recess. The resulting circumferential enlargement of the tube is the sealing bead 13 which is overlaid upon the upper surface 4, and provides a gastight seal between the outer surface of the pilot tube and the wall of the recess 5.

The method described immediately hereinabove provides a simple and efficacious gastight seal which is doubly secure by virtue of the sealing relationship of, first, the end portion of a pilot tube within the recess of the pilot tube manifold, or fitting, and then again, by the sealing bead around the periphery of the recess.

Occasionally, because of rough handling, a sufficient rotational torque may be exerted on a pilot tube to disrupt the seal with the pilot tube manifold. To prevent breaking the seal, and to resist the effect of rotational torque, the pilot tubes 2 are disposed in the recesses 5, sufficiently close to each other, to effect a tangential contact 16 (See FIG. 2) between the sealing beads 13, thus forming an interlock. Typically, ⅛-inch aluminum tubes having a 0.35-inch wall are disposed in recesses spaced about ⅛-inch apart.

In another embodiment of this invention, there is illustrated in FIG. 5 a pilot tube 20, one end 21 of which is slidingly inserted in a fitting, indicated generally at 22, having a recess 23 slightly larger in diameter than the outside diameter of the end 21 of the pilot tube 20. The recess 23 is provided with a stop means, such as a chamfer 24, to limit the travel of the end 21 when it is inserted in the recess 23. The fitting 22 may be of any suitable structure, and may have an externally threaded stem portion 25 having an axial bore 26 in open communication with the recess 23. It will be apparent that, depending upon the relative dimensions of the stem portion in comparison with the remainder of the fitting, the axes of the bore 26 and the pilot tube 20, may be nonaligned. It will be equally apparent that, a small fitting illustrated in FIG. 5, such as is used to secure a pilot light housing by threadedly disposing it snugly against the sheet metal in a stove top, will conveniently have the aforementioned axes aligned. The threads of the fitting, although shown in FIG. 5 disposed in longitudinal relationship with recess 23, may be formed on the surface of the fitting, radially outwardly of the recess 23, depending on the relative sizes of the tube and fitting and the purpose and use of the fitting, as at 30 in FIG. 6.

A gastight sealing bead 27 is formed on the pilot tube 20 in a manner analogous to that described hereinbefore, for a pilot tube manifold in which the ends of two pilot tubes are sealed. The fitting 22 with the pilot tube slidingly inserted therein, is held in a support block and moved longitudinally axially against the end 21 of the pilot tube 20 which is secured in a clamping means. Movement of the support block is continued until a sealing bead of desired size is formed, whereupon the movement is terminated, the support block retracted, and the pilot tube unclamped.

A further embodiment of this invention useful in fittings and manifolds adapted to receive single or multiple tubes is illustrated in FIG. 6 which is a vertical section taken as though along the line 6—6 in FIG. 5. The fitting 22, shown with threads 30 exteriorly disposed on the body of the fitting, is provided with an irregular recess 32, such as may be formed by drilling a cylindrical hole and broaching it to provide an irregular surface, or by inserting a wobbling tool to yield an out-of-round hole. The particular means for providing the irregular recess or hole is unimportant as long as the wall of the recess has an undulating bumpy or rough surface. As described for other embodiments hereinbefore, a cylindrical pilot tube is slidingly thrust into the recess 32, the fitting 22 is secured in a support block and moved longitudinally axially against the end 21 of the pilot tube 20 which is secured in a clamping means. The end of the pilot tube is deformed and the surface of the tube within the recess 32 is forced to conform to the irregularities of the recess, as indicated at 33, thus locking the pilot tube within the recess against rotational movement relative to the wall of the recess. This locking of the pilot tube is important because the length of a pilot tube can serve to generate great leverage and torque which must be resisted to effect a reliable and rugged gastight seal.

It will be apparent that irregularity of only a portion of the recess 32 will suffice to provide a locking effect. Thus, a bumpy or distorted portion of the recess extending to some distance intermediate the counterbore or stop means for the pilot tube and the periphery of the recess will effectively lock the tube in place. It will also be evident that the use of an irregular recess to provide this locking action is not limited to a single pilot tube in a fitting and may be used when plural pilot tubes are to be sealingly disposed in a manifold. The locking action provided in such an embodiment will serve to reinforce the interlocking action of contiguous sealing beads. Alternatively, where it is inconvenient or undesirable to provide interlocking sealing beads the locking action provided by irregular recesses may provide a sufficiently effective and rugged gastight seal.

Though it will be recognized, in each of the preferred embodiments hereinbefore described, that a pilot tube is slidingly inserted into a recess, and a circumferential bead formed to enhance the gastight seal effected by circumferential enlargement of the end of the pilot tube, it is also possible to press-fit the pilot tube into the recess and thereafter form the circumferential bead to enhance the effectiveness of the gastight seal to whatever extent it may do so.

Modifications, changes and improvements to the preferred forms of the invention herein disclosed, described and illustrated may occur to those skilled in the art who come to understand the principles and precepts thereof. Accordingly the scope of the patent to be issued herein should not be limited to the particular embodiments of the invention set forth herein, but rather should be limited by the advance by which the invention has promoted the art.

What is claimed is:

1. A tube and fitting assembly for fluid lines and the like, comprising a fitting means having a recess, a peripheral surface on said fitting means about said recess, said recess having an internal side wall having an irregular surface and being adapted to be placed in open flow communication with a fluid, an elongated tube having a side wall and an end, said tube end being inserted within said recess to a predeterminable depth from said peripheral surface, stop means within said recess determining said depth, said tube end abutting said stop means, a portion of said wall of said tube being distorted into engagement with said irregular surface and into complementary sealing engagement with said wall of said recess, and a sealing bead formed in said tube and in direct contact with said peripheral surface and forming a fluid tight seal between said fitting means and said tube, said wall of said tube being unbroken at and by said bead.

2. The assembly according to claim 1 wherein said irregular surface extends over at least a portion of said recess wall intermediate said stop means and said peripheral surface.

3. A pilot light harness for gas stoves and the like, comprising a manifold or fitting means having a recess, a peripheral surface on said fitting means about said recess, said recess having an internal side wall having an irregular surface and being adapted to be placed in open flow communication with a source of gas, an elongated pilot tube having a side wall and an end, said tube end being inserted within said recess to a predeterminable depth from said peripheral surface, stop means within said recess determining said depth, said tube end abutting said stop means, a portion of said wall of said tube being distorted into engagement with said irregular surface and complementary sealing engagement with said wall of said recess, and a sealing bead formed in said tube and in direct contact with said peripheral surface and forming a gastight seal between said fitting means and said tube, said wall of said tube being unbroken at and by said bead.

4. The pilot light harness according to claim 3 wherein said irregular surface extends for at least a portion of said wall of said recess intermediate said stop means and said periphery.

5. A pilot light harness for gas stoves and the like, comprising a manifold or fitting means having a plurality of recesses, a peripheral surface on said fitting means about each said recess, each said recess having an internal side wall having an irregular surface and being adapted to be placed in open flow communication with a source of gas, an elongated pilot tube for each said recess, each said tube having a side wall and an end, said tube ends being inserted in said recesses, respectively, to a predeterminable depth from the adjacent said peripheral surface, respectively, stop means within each said recess determining said depth, each said tube end abutting a said stop means, respectively, a portion of said wall of each said tube being distorted into engagement with said irregular surface and complementary sealing engagement with said wall of said recess within which said tube end is inserted, a sealing bead formed in each said tube in direct contact with said peripheral surface adjacent said recess in which the end thereof is inserted, and forming a gastight seal between said fitting means and said tube, said wall of each said tube being unbroken at and by said bead, respectively.

6. A process for forming a fluid seal between a tube, having an external wall and an end, and a fitting means, having a recess, having an internal wall and an internal stop means therein for receiving the end of said tube, and a peripheral surface on said fitting means surrounding said recess, said process comprising providing said wall of said recess with an irregular surface, inserting said end of said tube into said recess and against said stop means, fixedly, removably securing said fitting means in a support means, fixedly, removably securing said tube in a clamping means at a predetermined distance from said recess, and moving said support means and said clamping means relative to one another sufficiently to distend a portion of said wall of said tube to form a complementary engagement with said irregular surface and a sealing engagement with said wall of said recess and to distend another portion of said wall of said tube to form a circumferential sealing bead overlying and sealingly engaging said peripheral surface and the periphery of said recess.

7. A tube and fitting assembly for fluid lines and the like, comprising a fitting means having a plurality of recesses, a peripheral surface on said fitting means about each said recess, each said recess having an internal side wall and being adapted to be placed in open flow communication with a fluid, an elongated tube for each said recess, each said tube having a side wall and an end, said tube ends being inserted within said recesses, respectively, to a predeterminable depth from the adjacent said peripheral surface, stop means within each said recess determining said depth, each said tube end abutting a said stop means, respectively, a portion of said wall of each said tube being distorted into complementary sealing engagement with said wall of said recess within which said tube end is inserted, a sealing bead formed in each said tube in direct contact with said peripheral surface adjacent said recess in which the end thereof is inserted and forming a gastight seal between said fitting means and said tube, said wall of each said tube being unbroken at and by said bead, each said sealing bead being in engagement with at least one other said sealing bead, and said sealing bead engagement defining a substantially straight line interface on the chord of a circle between said engaged sealing beads whereby to prevent relative rotation of each said tube about its axis.

8. A pilot light harness for gas stoves and the like, comprising a manifold or fitting means having a plurality of recesses, a peripheral surface on said fitting means about each said recess, each said recess having an internal side wall having an irregular surface and being adapted to be placed in open flow communication with a source of gas, an elongated pilot tube for each said recess, each said tube having a side wall and an end, said tube ends being inserted within said recesses, respectively, to a predeterminable depth from the adjacent said peripheral surface, stop means within each said recess determining said depth, each said tube end abutting a said stop means, respectively, a portion of said wall of each said tube being distorted into engagement with said irregular surface and complementary sealing engagement with said wall of said recess within which said tube end is inserted, a sealing bead formed in each said tube in direct contact with said peripheral surface adjacent said recess within which the end thereof is inserted and forming a gastight seal between said fitting means and said tube, said wall of each said tube being unbroken at and by said bead, each said sealing bead being in engagement with at least one other said sealing bead, and said engagement therebetween defining a substantially straight line interface on the chord of a circle between said engaged sealing beads, whereby to prevent relative rotation of each said tube about its axis.

9. A process for forming a fluid seal between a tube having an external wall and an end, and a fitting means having a recess, having an internal wall and an internal stop means therein, for receiving the end of said tube, and a peripheral surface on said fitting means surrounding said recess, said process comprising providing said wall of said recess with an irregular surface, inserting said end of said tube into said recess and against said stop means, fixedly, removably securing said fitting means in a support means, fixedly, removably securing said tube in a clamping means at a predetermined distance from said recess, and moving said support means and said clamping means relative to one another sufficiently to distend a portion of said wall of said tube to form a complementary engagement with said irregular surface and a sealing engagement with said wall of said recess and to distend another portion of said wall of said tube to form a circumferential sealing bead overlying and sealingly engaging said peripheral surface and the periphery of said recess, in which each said sealing bead flows into tangential engagement with at least one other said sealing bead, and each said bead engagement defines a substantially straight line interface on the chord of a circle between said engaged sealing beads whereby to prevent relative rotation of each said tube about its axis.

10. A process for forming a gastight seal between at least one pilot tube, each having a wall and an end, and a pilot tube manifold or fitting means, having at least one recess, each having a periphery, a shoulder or stop means therein, and a wall extending between said shoulder means and periphery, for receiving a said end of a said pilot tube, said process comprising providing said wall of each said recess intermediate the periphery and shoulder of said recess with an irregular surface portion, slidingly inserting an end of a said pilot tube in each said recess against said shoulder means, fixedly, removably securing said manifold or fitting means in a support means, fixedly, removably securing each said pilot tube, at the same predetermined distance from said recesses, respectively, in a clamping means, and moving said support means and said clamping means relative to one another to distend the wall of each said tube against said irregular surface and into sealing engagement with said wall of each said recess, respectively, and to form a circumferential sealing bead on the wall of each tube and in sealing engagement with the periphery of each said recess, respectively.

11. A tube and fitting assembly for fluid lines and the like, comprising a fitting means having a plurality of recesses, a peripheral surface on said fitting means about each said recess, each said recess having an internal side wall having an irregular surface and being adapted to be placed in open flow communication with a fluid, an elongated tube for each said recess, each said tube having a side wall and an end, said tube ends being inserted within said recesses, respectively, to a predetermined depth from the adjacent said peripheral surface, stop means within each said recess determining said depth, each said tube end abutting a said stop means, respectively, a portion of said wall of each said tube being distorted into engagement with said irregular surface and complementary sealing engagement with said wall of said recess within which said tube end is inserted, a sealing bead formed in each said tube in direct contact with said peripheral surface adjacent said recess in which the end thereof is inserted and forming a gastight seal between said fitting means and said tube, said wall of each said tube being unbroken at and by said bead.

12. The tube and fitting assembly according to claim 11 in which each said sealing bead is in engagement with at least one other said sealing bead, and each said sealing bead engagement defines a substantially straight line interface on the chord of a circle between said engaged sealing beads whereby to prevent relative rotation of each said tube about its axis.

13. A pilot light harness for gas stoves and the like, comprising a manifold or fitting means having a plurality of recesses, a peripheral surface on said fitting means about each said recess, each said recess having an internal side wall and being adapted to be placed in open flow communication with a source of gas, an elongated pilot tube for each said recess, each said tube having a side wall and an end, said tube ends being inserted within said recess, respectively, to a predeterminable depth from the adjacent said peripheral surface, stop means within each said recess determining said depth, each said tube end abutting a said stop means, respectively, a portion of said wall of each said tube being distorted into complementary sealing engagement with said wall of said recess within which said tube end is inserted, a sealing bead formed in each said tube in direct contact with said peripheral surface adjacent said recess within which the end thereof is inserted and forming a gastight seal between said fitting means and said tube, said wall of each said tube being unbroken at and by said bead, each said sealing bead being in engagement with at least one other said sealing bead, and said engagement therebetween defining a substantially straight line interface on the chord of a circle between said engaged sealing beads, whereby to prevent relative rotation of each said tube about its axis.

* * * * *